US012771962B2

(12) United States Patent
Jang et al.

(10) Patent No.: US 12,771,962 B2
(45) Date of Patent: Oct. 20, 2026

(54) IMAGE SIGNAL PROCESSOR AND IMAGE SIGNAL PROCESSING METHOD

(71) Applicant: SK hynix Inc., Icheon-si (KR)

(72) Inventors: Cheol Jon Jang, Icheon-si (KR); Dong Ik Kim, Icheon-si (KR); Jun Hyeok Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 426 days.

(21) Appl. No.: 18/432,808

(22) Filed: Feb. 5, 2024

(65) Prior Publication Data

US 2025/0024159 A1 Jan. 16, 2025

(30) Foreign Application Priority Data

Jul. 14, 2023 (KR) ........................ 10-2023-0092057

(51) Int. Cl.

| | |
|---|---|
| ***H04N 25/683*** | (2023.01) |
| ***G06T 5/20*** | (2006.01) |
| ***G06T 7/13*** | (2017.01) |
| ***H04N 23/81*** | (2023.01) |
| ***H04N 23/84*** | (2023.01) |
| ***H04N 25/704*** | (2023.01) |

(52) U.S. Cl.

CPC ............. *H04N 25/683* (2023.01); *G06T 5/20* (2013.01); *G06T 7/13* (2017.01); *H04N 23/81* (2023.01); *H04N 23/843* (2023.01); *H04N 25/704* (2023.01); *G06T 2207/20182* (2013.01)

(58) Field of Classification Search

None

See application file for complete search history.

(56) References Cited

U.S. PATENT DOCUMENTS

| | | | | |
|---|---|---|---|---|
| 9,332,199 | B2 | 5/2016 | Furuta | |
| 2008/0152230 | A1* | 6/2008 | Forutanpour | H04N 25/683 382/199 |
| 2014/0348431 | A1* | 11/2014 | Brick | G06V 10/44 382/195 |
| 2020/0364828 | A1 | 11/2020 | Chou et al. | |
| 2023/0063787 | A1* | 3/2023 | Chih | G06T 5/70 |

FOREIGN PATENT DOCUMENTS

| | | | |
|---|---|---|---|
| JP | 5456206 | B2 | 3/2014 |
| JP | 2019113477 | A | 7/2019 |
| KR | 100543350 | B1 | 6/2006 |

* cited by examiner

*Primary Examiner* — Paul M Berardesca

(74) *Attorney, Agent, or Firm* — WILLIAM PARK AND ASSOCIATES LTD.

(57) ABSTRACT

An image signal processor includes a first determiner and a pixel interpolator. The first determiner compares a target gradient combination for a target kernel including a target pixel with a reference gradient combination for each of a plurality of corner patterns to calculate a similarity score, and determines at least one corner pattern based on the calculated similarity score. The pixel interpolator interpolates the target pixel using pixel data of interpolation pixels determined based on the corner pattern.

19 Claims, 17 Drawing Sheets

500

| Pair of Pixel | (1) | (2) | (3) | (4) | (5) | (6) | (7) | (8) | (9) | (10) | (11) | (12) | (13) | (14) | (15) | (16) | (17) | (18) | (19) | (20) | (21) | (22) | Similarity score |
|---|---|---|---|---|---|---|---|---|---|---|---|---|---|---|---|---|---|---|---|---|---|---|---|
| PT_A | large | large | large | large | large | large | small | small | large | large | large | large | small | small | large | small | large | small | small | small | large | large | 11 |
| PT_B | large | large | large | large | large | large | small | small | large | large | small | small | large | large | small | small | large | large | large | small | large | small | 11 |
| PT_C | large | large | large | large | large | large | small | small | large | large | small | small | large | large | large | large | small | small | small | large | small | large | 9 |
| PT_D | large | large | large | large | large | large | small | small | large | large | large | large | small | small | small | large | small | large | large | large | small | small | 9 |
| PT_E | large | large | large | small | large | small | large | small | large | large | large | large | small | small | small | small | small | small | large | large | small | small | 10 |
| PT_F | large | large | large | small | small | large | small | large | large | large | small | small | large | large | large | large | small | small | small | small | small | small | 12 |
| PT_G | large | large | small | large | large | small | small | large | large | large | small | small | large | large | small | small | large | large | small | small | small | small | 8 |
| PT_H | large | large | small | large | small | large | large | small | large | large | large | large | small | small | small | small | small | small | small | small | large | large | 12 |

| 400 | | | | | | | | | | | | | | | | | | | | | | | 510 |
|---|---|---|---|---|---|---|---|---|---|---|---|---|---|---|---|---|---|---|---|---|---|---|---|
|  | small | small | large | small | small | large | small | large | large | small | small | large | large | small | small | small | small | small | large | small | large | large | |

FIG. 7

| Corner pattern | Pixel combination For filtering |
|---|---|
| PT_A | 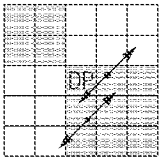 |
| PT_B | 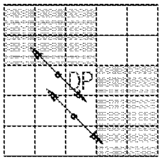 |
| PT_C | 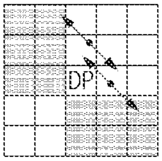 |
| PT_D | 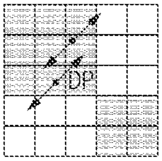 |
| PT_E | 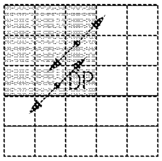 |
| PT_F | 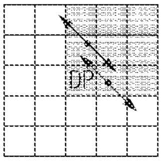 |
| PT_G | 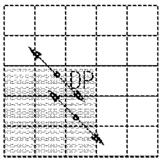 |
| PT_H | 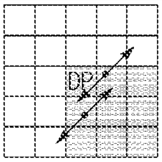 |
FIG.11A

| Corner pattern | Pixel combination For filtering |
|---|---|
| PT_A | 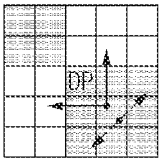 |
| PT_B | 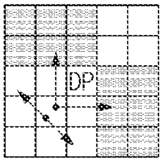 |
| PT_C | 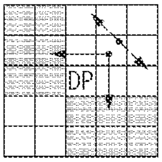 |
| PT_D | 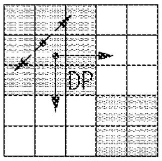 |
| PT_E | 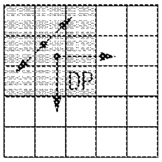 |
| PT_F | 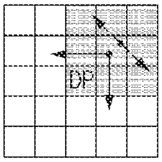 |
| PT_G | 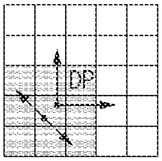 |
| PT_H | 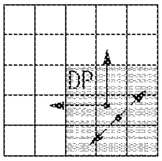 |
FIG.11B

IMAGE SIGNAL PROCESSOR AND IMAGE SIGNAL PROCESSING METHOD

CROSS-REFERENCE TO RELATED APPLICATION

This patent document claims the priority and benefits of Korean patent application No. 10-2023-0092057, filed on Jul. 14, 2023, in the Korean Intellectual Property Office, the disclosure of which is incorporated by reference in its entirety as part of the disclosure of this patent document.

TECHNICAL FIELD

The technology and implementations disclosed in this patent document generally relate to an image signal processor capable of performing image conversion and an image signal processing method for the same.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various fields such as smart phones, digital cameras, game machines, IoT (Internet of Things), robots, surveillance cameras and medical micro cameras.

An original image captured by the image sensing device may include a plurality of pixels corresponding to different colors (e.g., red, blue, and green). The plurality of pixels included in the original image may be arranged according to a certain arrangement of the color patterns, such as, a Bayer pattern arrangement. In order to convert the original image into a complete image (e.g., RGB images), an operation of interpolating pixels may be performed according to a predetermined algorithm. Since this algorithm basically includes an operation of interpolating pixels having lost (or missed) information using information of the neighboring pixels, there may occur serious noise in images with specific patterns due to limitations of such algorithm.

SUMMARY

In accordance with an embodiment of the disclosed technology, an image signal processor may include a first determiner configured to compare a target gradient combination for a target kernel including a target pixel with a reference gradient combination for each of a plurality of corner patterns to calculate a similarity score, and determine at least one corner pattern based on the calculated similarity score; and a pixel interpolator configured to interpolate the target pixel using pixel data of interpolation pixels determined based on the corner pattern.

In accordance with another embodiment of the disclosed technology, an image signal processing method may include comparing a target gradient combination for a target kernel including a target pixel with a reference gradient combination for each of a plurality of corner patterns to calculate a similarity score, determining a corner pattern corresponding to the target kernel based on the similarity score; and interpolating the target pixel using pixel data of interpolation pixels determined based on the corner pattern.

BRIEF DESCRIPTION OF THE DRAWINGS

The above and other features and beneficial aspects of the disclosed technology will become readily apparent with reference to the following detailed description when considered in conjunction with the accompanying drawings.

FIG. 7 is a schematic diagram illustrating an example of detailed operations of the operation S200 shown in FIG. 5 based on some implementations of the disclosed technology.

FIGS. 11A and 11B are schematic diagrams illustrating examples of pixel combinations used in the Laplacian filter of the operation S400 of FIG. 10 based on some implementations of the disclosed technology.

DETAILED DESCRIPTION

Figure 1:
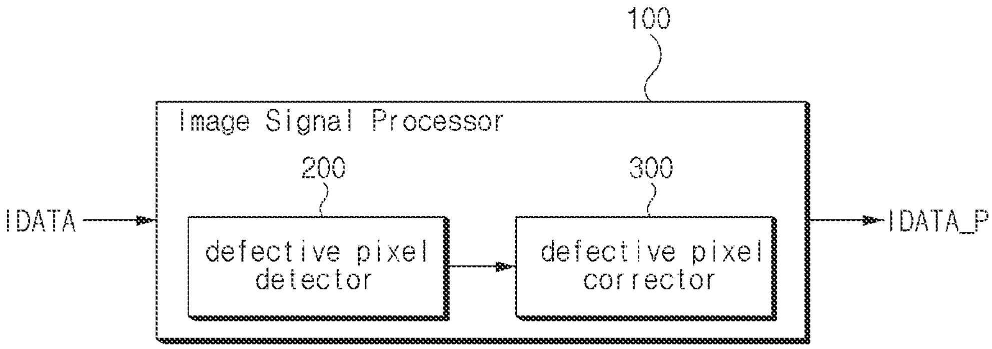
FIG. 1 is a block diagram illustrating an example of an image signal processor based on some implementations of the disclosed technology.

This patent document provides implementations and examples of an image signal processor and an image signal processing method capable of increasing the accuracy of correction for defective pixels or the like, that may be used in configurations to substantially address one or more technical or engineering issues and to mitigate limitations or disadvantages encountered in some image signal processors in the art. Some implementations of the disclosed technology relate to an image signal processor and an image signal processing method that can increase the accuracy of correction for defective pixels or the like. In recognition of the issues above, the image signal processor based on some implementations of the disclosed technology can interpolate the target pixel by determining a corner pattern corresponding to a target kernel, and can increase the accuracy of correction for defective pixels even when the target kernel corresponds to the corner pattern.

Reference will now be made in detail to some embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereinafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Various embodiments of the disclosed technology relate to an image signal processor capable of increasing the accuracy of correction for defective pixels or the like, and an image signal processing method for the same.

It is to be understood that both the foregoing general description and the following detailed description of the disclosed technology are illustrative and explanatory and are intended to provide further explanation of the disclosure as claimed.

Figure 2:
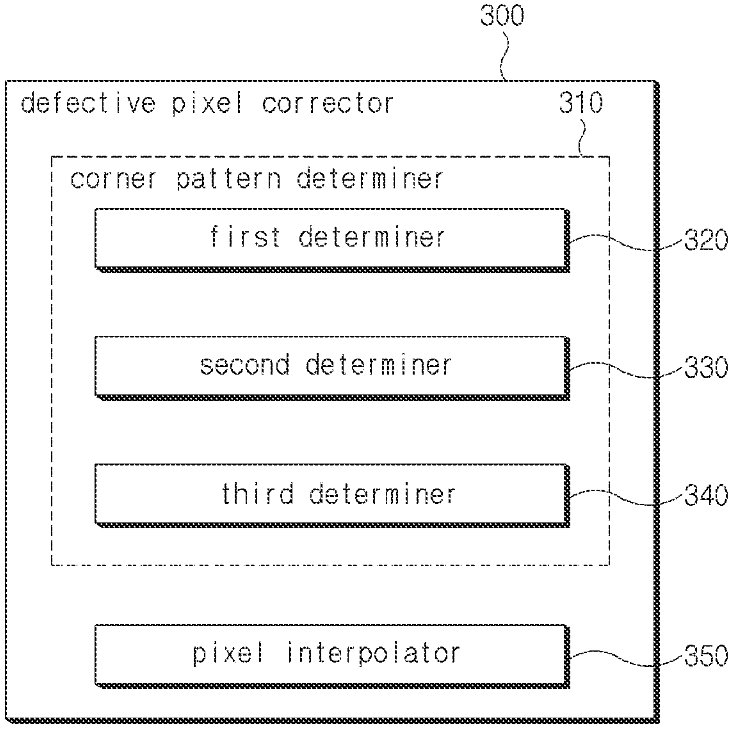
FIG. 2 is a block diagram illustrating an example of a defective pixel corrector shown in FIG. 1 based on some implementations of the disclosed technology.
Figure 3:
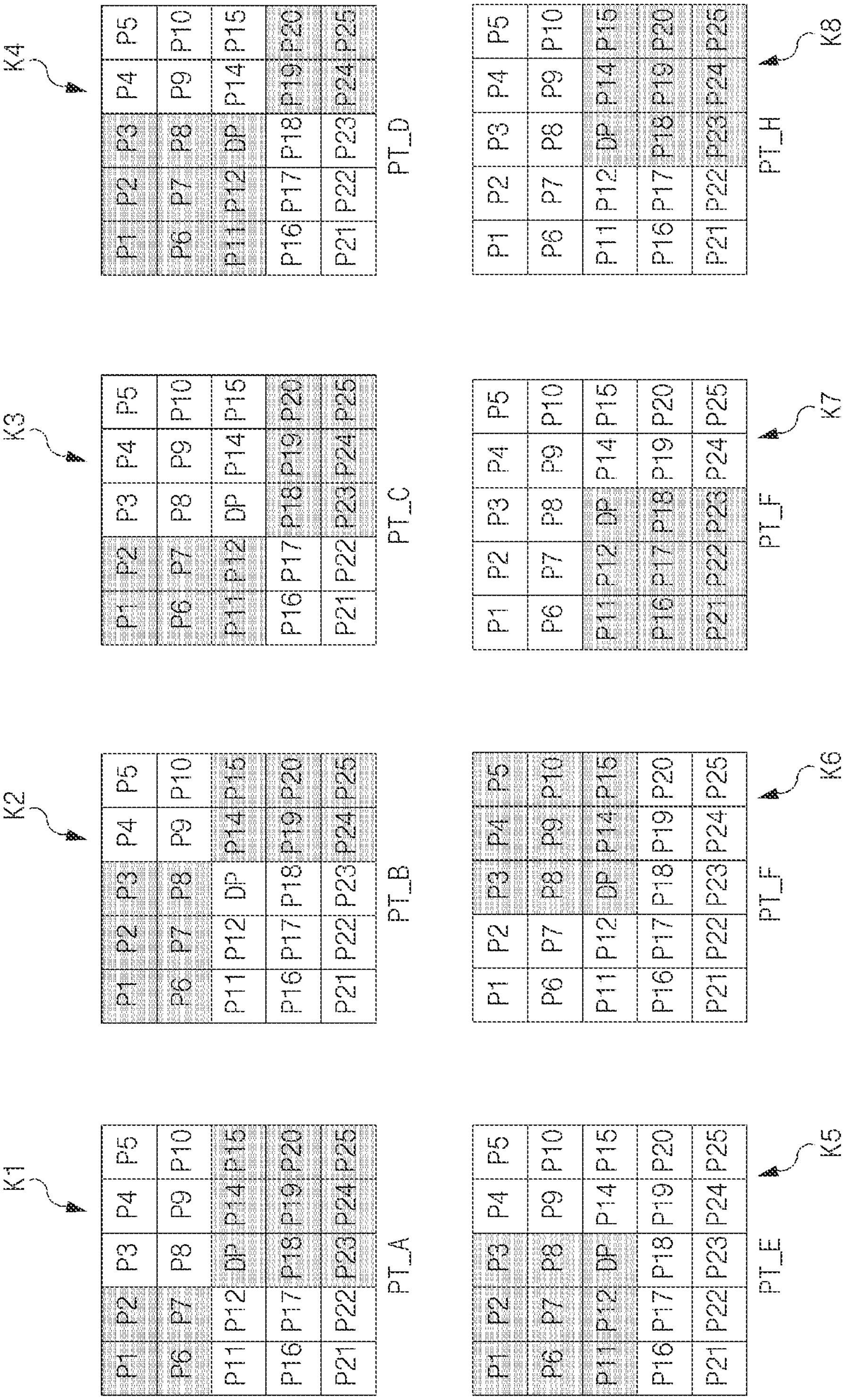
FIG. 3 is a schematic diagram illustrating an example of a corner pattern based on some implementations of the disclosed technology.

FIG. 1 is a block diagram illustrating an example of an image signal processor 100 based on some implementations of the disclosed technology. FIG. 2 is a block diagram illustrating an example of a defective pixel corrector shown in FIG. 1 based on some implementations of the disclosed technology. FIG. 3 is a schematic diagram illustrating an example of a corner pattern based on some implementations of the disclosed technology.

Referring to FIG. 1, the image signal processor (ISP) 100 may perform at least one image signal process on image data (IDATA) to generate the processed image data (IDATA_P). The image signal processor 100 may reduce noise of image data (IDATA), and may perform various kinds of image signal processing (e.g., demosaicing, defect pixel correction, gamma correction, color filter array interpolation, color matrix, color correction, color enhancement, lens distortion correction, etc.) for image-quality improvement of the image data. In addition, the image signal processor 100 may compress image data that has been created by execution of image signal processing for image-quality improvement, such that the image signal processor 100 can create an image file using the compressed image data. Alternatively, the image signal processor 100 may recover image data from the image file. In this case, the scheme for compressing such image data may be a reversible format or an irreversible format. As a representative example of such compression format, in the case of using a still image, Joint Photographic Experts Group (JPEG) format, JPEG 2000 format, or the like can be used. In addition, in the case of using moving images, a plurality of frames can be compressed according to Moving Picture Experts Group (MPEG) standards such that moving image files can be created.

The image data (IDATA) may be generated by an image sensing device that captures an optical image of a scene, but the scope of the disclosed technology is not limited thereto. The image sensing device may include a pixel array, a control circuit, and a readout circuit. The pixel array may include a plurality of pixels configured to sense an incident light provided from a scene. The control circuit may be configured to control the pixel array to generate an analog pixel signal. The readout circuit may be configured to output digital image data (IDATA) by converting the analog pixel signal into the digital image data (IDATA). In some implementations of the disclosed technology, it is assumed that the image data (IDATA) is generated by the image sensing device.

The pixel array of the image sensing device may include at least one defective pixel that cannot normally capture a color image due to process limitations or temporary noise inflow. In addition, the pixel array may include at least one phase difference detection pixel. As is well known, the phase difference detection pixel may be configured to acquire phase difference-related information to improve autofocus performance. For example, the phase difference detection pixel may include a different shape from the pixel. The phase difference detection pixels cannot sense color images in the same manner as defective pixels, such that the phase difference detection pixels can be treated as defective pixels from the point of view of color images. In some implementations, for convenience of description and better understanding of the disclosed technology, the defective pixel and the phase difference detection pixel, each of which cannot normally sense the color image, will hereinafter be collectively referred to as “defective pixels”.

In order to increase the quality of color images, the image signal processor 100 are required to accurately correct the defective pixels. To this end, the image signal processor 100, based on some implementations of the disclosed technology, may include a defective pixel detector 200 and a defective pixel corrector 300.

In exemplary embodiments, the defective pixel detector 200 may detect pixel data of the defective pixel among a plurality of pixels of a pixel array based on the image data (IDATA). In some implementations of the disclosed technology, for convenience of description, digital data corresponding to an output signal (hereinafter, a pixel signal) of each pixel will hereinafter be defined as pixel data, and a set of pixel data corresponding to a predetermined unit (e.g., a frame or kernel) will hereinafter be defined as image data (IDATA). Here, the frame may correspond to the entire pixel array including the plurality of pixels. The kernel may refer to a unit for image signal processing. For example, the kernel may refer to a group of the pixels on which the image signal processing is performed at one time. In addition, an actual value of the pixel data may be defined as a “pixel value”.

In some implementations, the defective pixel detector 200 may detect pixel data of the defective pixel based on the image data (IDATA). For example, the defective pixel detector 200 may compare pixel data of a target pixel with an average value of pixel data of the pixels in the kernel (hereinafter, the average value of the pixel data of the kernel). The defective pixel detector 200 may determine whether the target pixel is a defective pixel based on a difference between the pixel data of the target pixel and the average value of the pixel data of the kernel. For example, the defective pixel detector 200 may determine that the target pixel is a defective pixel when the difference is equal to or greater than a threshold value.

The threshold value to be described later may be a fixed constant or may be a specific ratio of a brightness value (e.g., a green average value) of the kernel. In addition, in some implementations, it is assumed that, when a measurement value (for example, the difference) is compared with the threshold value, if the measurement value is equal to or greater than the threshold value, this condition will hereinafter be denoted by "Large" for convenience of description, and if the measurement value is less than the threshold value, this condition will hereinafter be denoted by "Small" for convenience of description.

In some other implementations, the defective pixel detector 200 may receive pre-stored position information of defective pixels obtained based on a previous process for correcting the defective pixel or a pixel test process. Further, the defective pixel detector 200 may determine whether the target pixel is a defective pixel based on the position information of the defective pixels. For example, the image sensing device may determine position information of inherently defective pixels as the position information of the defective pixels. Further, the image sensing device may store the position information of the defective pixels in an internal storage (e.g., one time programmable (OTP) memory), and may provide the position information of the defective pixels to the image signal processor 100.

When the target pixel is determined to be a defective pixel by the defective pixel detector 200, the defective pixel corrector 300 may correct the pixel data of the target pixel based on image data of a kernel including the target pixel.

Referring to FIG. 2, the defective pixel corrector 300 may include a corner pattern determiner 310 and a pixel interpolator 350.

The corner pattern determiner 310 may determine a corner pattern corresponding to a target kernel including a target pixel.

Image data IDATA corresponding to one kernel (or one frame) may include textures of various sizes and shapes. The texture may refer to a set (or aggregate) of pixels having similarity. For example, a subject having a unified color included in a captured scene may be recognized as a texture. The boundary of the texture may include at least one corner. For example, pixels inside the corner (hereafter, inside pixels) and pixels outside the corner (hereafter, outside pixels). A difference between pixel data of the inside pixels and pixel data of the outside pixel may be larger than a difference between pixel data of neighboring pixels not bounded by the corner.

In FIG. 3, a corner pattern is shown as an example. A corner may refer to two line-segments that are located on the horizontal and vertical lines crossing the kernel and come in contact with each other at a cross-point where the two lines cross each other. As such, a pattern in which pixels included in the kernel are distinguished from each other based on the corner serving as the boundary may be defined as a corner pattern. For example, a first line of the two lines may be the vertical line dividing in the kernel in a vertical direction and a second line of the two lines may be the horizontal line dividing in the kernel in a horizontal direction. The first line may be crossed with the second line. For example, the corner may be contact with both the first line, the second line and the cross-point. The corner pattern may be defined as at least one pixel forming the same texture as the pixel located at the corner.

In this case, when the target pixel of the kernel is a defective pixel, the image signal processor 100 may correct a target pixel DP based on pixel data of adjacent pixels arranged according to the corner pattern.

Referring to FIG. 3, the kernels K1 to K8 may include first to twenty-fifth pixels (P1~P25) arranged in a 5×5 matrix form. For example, a target pixel DP may be positioned at the center of the kernels K1 to K8, respectively.

In addition, shaded pixels of FIG. 3 may refer to pixels constituting corner pattern(s). Here, the pixel data of the target pixel DP may mean normal color pixel data that can be obtained when the target pixel DP is a normal pixel.

Referring to FIG. 3, examples of corner patterns, each of which includes two corners, are illustrated as denoted by PT_A, PT_B, PT_C, and PT_D, respectively. In each of PT_A to PT_D of FIG. 3, various types of corner patterns, each of which includes two corners that come in contact with each other at one vertex of the target pixel DP, are illustrated. In addition, examples of corner patterns, each of which includes one corner, are illustrated as denoted by PT_E to PT_H. In each of PT_E to PT_H of FIG. 3, various corner patterns each including a target pixel DP are illustrated such that the corner patterns share one vertex of the target pixel DP in the target kernel as a vertex of the corner. The corner patterns shown in FIG. 3 are disclosed only for illustrative purposes, and there may exist various corner patterns, each of which is filled with a texture region and a non-texture region that are distinguished from each other based on the horizontal and vertical lines that serve as a boundary while crossing the kernel. That is, the size and shape of the texture region may vary. Thus, the location and number of corner patterns may also vary.

More detailed, the kernels K1 to K8 may include at least one corner pattern PT_A to PT_H. For example, the kernels K1 to K4 may include two corner patterns PT_A to PT_D based on the cross-point of the corner. The kernels K5 to K8 may include one corner pattern PT_E to PT_H. The corner patterns PT_A, PT_D, PT_E, PT_F, PT_G, and PT_H may include the target pixels DP located at each of their vertices. Meanwhile, the target pixel DP might not be located within the corner patterns PT_B and PT_C.

Although the embodiment of the disclosed technology assumes that there are eight corner patterns in the (5×5) kernel for convenience of description, other implementations are also possible, and it should be noted that more diverse corner patterns may exist in a kernel larger than the (5×5) kernel as needed. The defective pixel correction method based on some implementations of the disclosed technology can also be applied in substantially the same way to these corner patterns.

Referring back to FIG. 2, the corner pattern determiner 310 may include a first determiner 320, a second determiner 330, and a third determiner 340.

The first determiner 320 may compare a target gradient combination with a reference gradient combination. The target gradient combination may be related to a target kernel including a target pixel DP. The reference gradient combination may be related to each of the corner patterns. The first determiner 320 may generate a similarity score by the comparison result. Furthermore, the first determiner 320 may determine a corner pattern corresponding to the target kernel based on the similarity score.

In some implementations, the reference gradient combination lists the reference gradient, which is the result of comparing the difference value between pixel data of each of plurality of pixel pairs with a predetermined threshold value. Here, the reference gradient may mean that the reference gradient is arranged corresponding to the plurality of pixel pairs. For example, the pixel pair may be two pixels of the same color but located in different positions in the corner pattern.

In some implementations, the target gradient combination lists the target gradient. The target gradient may be arranged corresponding to the plurality of pixel pairs. Here, the target gradient may be obtained by comparing a difference value between pixel data of pixels of each of the plurality of pixel pairs with a predetermined threshold value based on image data (IDATA) that was input to the target kernel by using the positions of pixels of the plurality of pixel pairs used in the reference gradient combination without change. That is, positions of the pixel pairs in the target kernel may be same as the position of the pixel pairs for obtaining the reference gradient combination. The plurality of pixel pairs will be described in more detail below.

When a plurality of corner patterns is determined by the first determiner 320, the second determiner 330 may determine a corner pattern corresponding to the target kernel based on a complex gradient combination corresponding to each of the corner patterns determined by the first determiner 320 with respect to the target kernel.

In some implementations, the complex gradient combination may refer to a result of comparison between average values of a difference in pixel data between two pixels allocated to each of the pixel combinations.

When a plurality of corner patterns is determined by the second determiner 330, the third determiner 340 may determine a corner pattern corresponding to the target kernel based on a result of applying a Laplacian filter corresponding to each of the corner patterns determined by the second determiner 330 to the target kernel.

In some implementations, the Laplacian filter may mean a difference, for each pixel combination, between a value obtained by doubling pixel data of one of three pixels and a value corresponding to the sum of pixel data values of the remaining two pixels other than the one pixel.

When the corner pattern corresponding to the target kernel is determined by the corner pattern determiner 310, the pixel interpolator 350 may interpolate the target pixel DP using pixel data of pixels based on the corner pattern determined by the corner pattern determiner 310.

More detailed operations of the defective pixel corrector 300 will be described later with reference to the attached drawings below FIG. 4.

Figure 4:
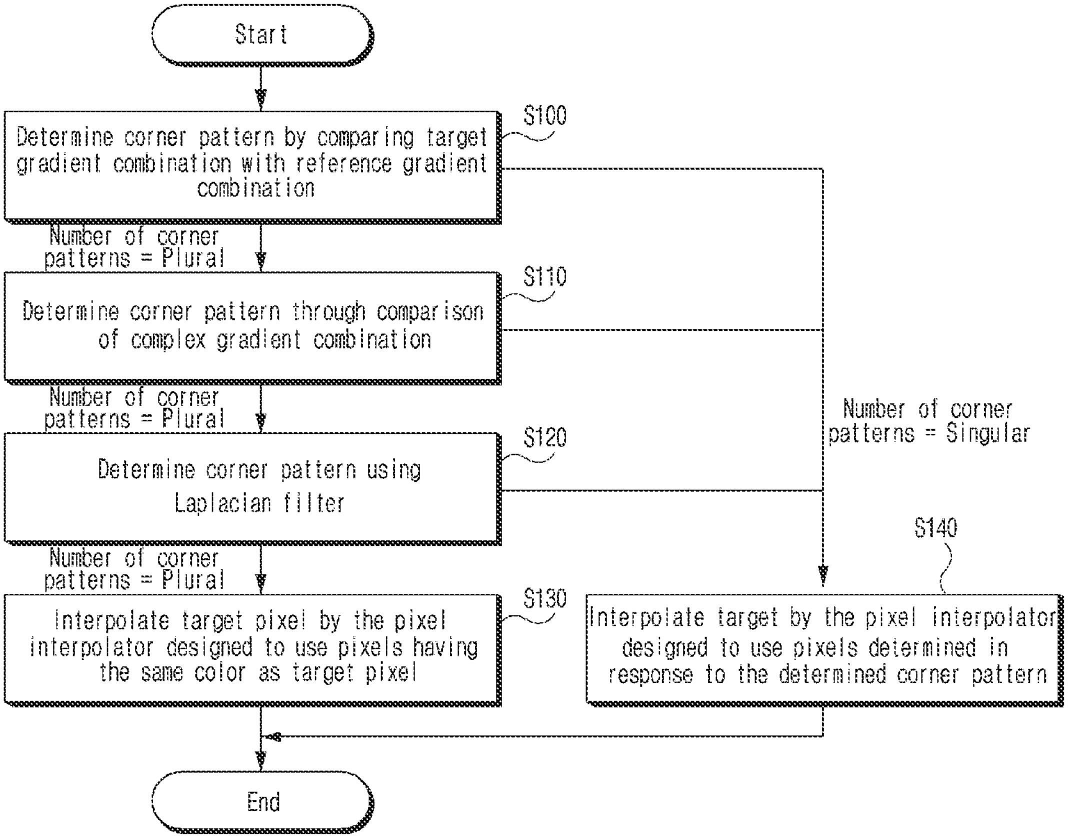
FIG. 4 is a flowchart illustrating an example operation of a pattern determiner shown in FIG. 2 based on some implementations of the disclosed technology.
Figure 5:
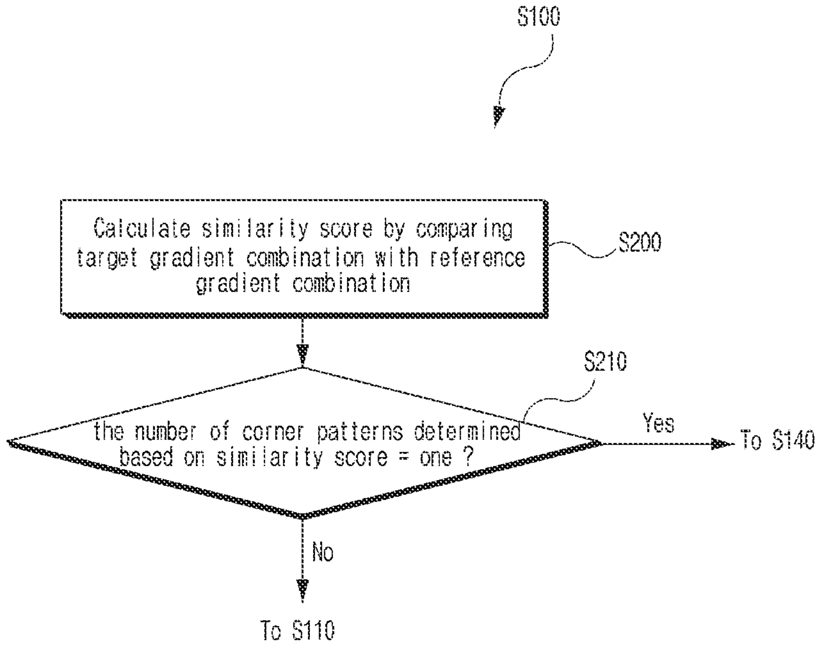
FIG. 5 is a flowchart illustrating an example of detailed operations of the operation S100 shown in FIG. 4 based on some implementations of the disclosed technology.
Figure 6A:
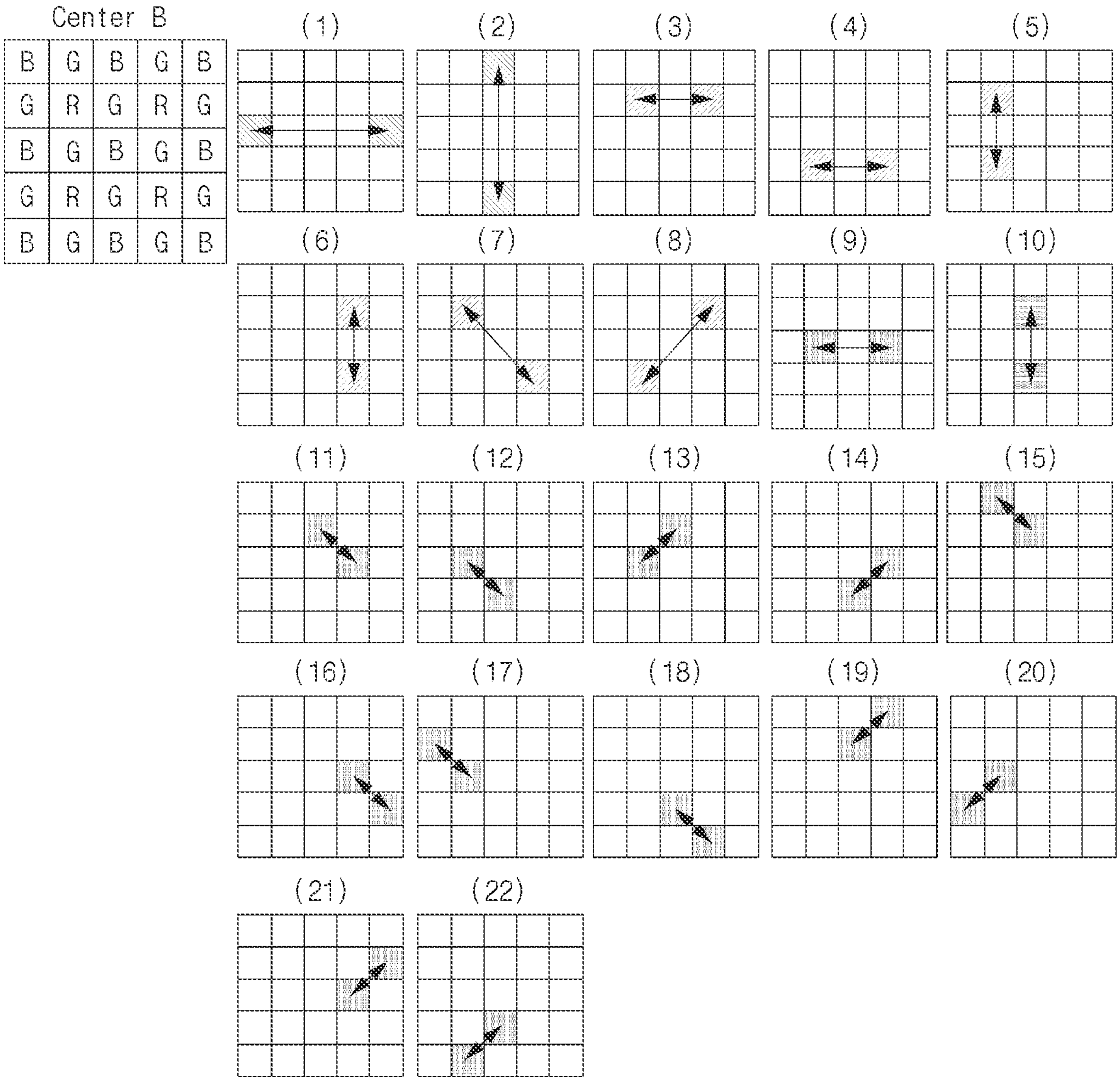
FIGS. 6A and 6B are schematic diagrams illustrating examples of a plurality of pixel pairs used in reference gradient combinations of the operation S200 shown in FIG. 5 based on some implementations of the disclosed technology.
Figure 6B:
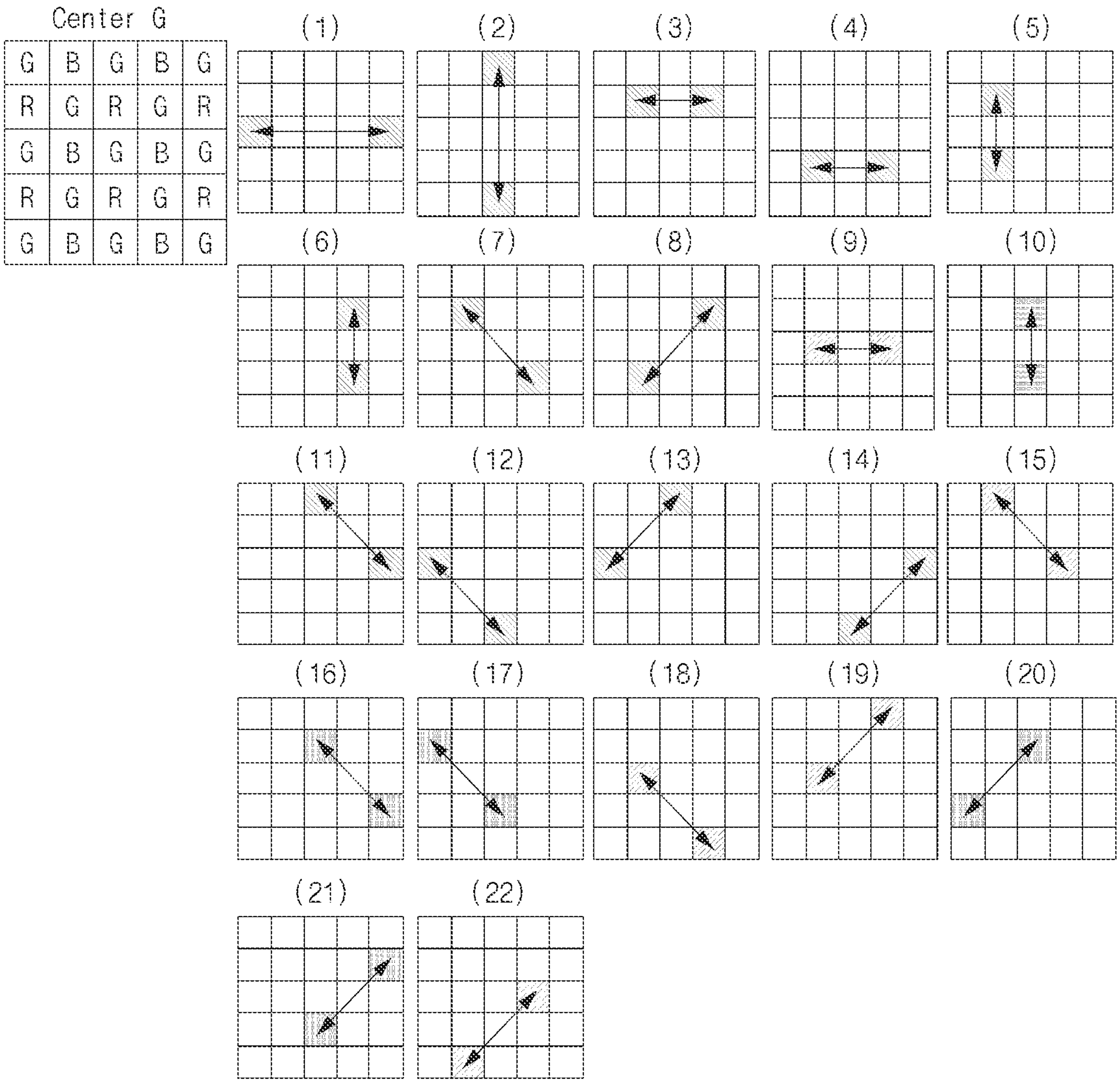

FIG. 4 is a flowchart illustrating an example operation of the pattern determiner shown in FIG. 2 based on some implementations of the disclosed technology. FIG. 5 is a flowchart illustrating an example of detailed operations of the operation S100 shown in FIG. 4 based on some implementations of the disclosed technology. FIGS. 6A and 6B are schematic diagrams illustrating examples of a plurality of pixel pairs used in reference gradient combinations of the operation S200 shown in FIG. 5 based on some implementations of the disclosed technology. FIG. 7 is a schematic diagram illustrating an example of detailed operations of the operation S200 shown in FIG. 5 based on some implementations of the disclosed technology.

Referring to FIG. 4, the defective pixel corrector 300 may determine a type of the corner pattern by determining whether predetermined conditions are satisfied for the target kernel including the target pixel DP, and may interpolate the target pixel DP using an interpolation method corresponding to the determined type of the corner pattern.

In FIGS. 4 to 13, examples of a method for correcting a defective pixel using a (5×5) kernel indicating a Bayer pattern as an example will hereinafter be described in detail. For example, the Bayer pattern may be a (5×5) kernel that includes blue pixels (B), red pixels (R), and green pixels (G). The red pixel (R) may generate red pixel data by detecting red light, the green pixel (G) may generate green pixel data by detecting green light, and the blue pixel (B) may generate blue pixel data by detecting blue light. In addition, it is assumed that each of the red pixel data, the green pixel data, and the blue pixel data has a range of 0 to 1023.

Although the embodiment of the disclosed technology has disclosed that the image is a (5×5)-sized kernel having 25 pixels arranged in a Bayer pattern for convenience of description, the technical idea of the disclosed technology can also be applied to another kernel in which color pixels are arranged in other patterns such as a quad-Bayer pattern, a nona-Bayer pattern, a hexa-Bayer pattern, an RGBW pattern, a mono pattern, etc., and the types of image patterns are not limited thereto and can also be sufficiently changed as needed. In addition, a kernel having another size (e.g., a (10×10) size) other than the (5×5) size may be used depending on performance of the image signal processor 100, required correction accuracy, an arrangement method of color pixels, and the like.

The first determiner 320 may compare a reference gradient combination with a target gradient combination of the target kernel in which the target pixel DP determined to be a defective pixel by the defective pixel detector 200 is located at the center of the target kernel (S100). The first determiner 320 may determine at least one corner pattern corresponding to the target kernel based on the result of comparison.

When the first determiner 320 determines the presence of only one corner pattern corresponding to the target kernel (e.g., the number of corner patterns in S100=singular number), the pixel interpolator 350 may interpolate the target pixel DP based on pixel data of some pixels that have the same color as the target pixel DP while being included in the same region as a texture or non-texture region of the corner pattern including the target pixel DP (S140). For example, when the corner pattern includes the target pixel DP as a texture region and the target pixel DP is a blue pixel, the pixel interpolator 350 may set an average value of pixel data of blue pixels located in the texture region of the corner pattern belonging to the target kernel as pixel data of the target pixel DP.

When the first determiner 320 determines the presence of a plurality of corner patterns corresponding to the target kernel (e.g., the number of corner patterns in S100=plural number), the second determiner 330 may calculate a complex gradient combination for the target kernel to determine whether the number of the corner pattern corresponding to the target kernel (S110). For example, the second determiner 320 may determine whether the number of the corner pattern of the target kernel is 1, based on the complex gradient combination.

When the second determiner 330 determines the presence of only one corner pattern corresponding to the target kernel (e.g., the number of corner patterns in S110=singular number), the pixel interpolator 350 may interpolate the target pixel DP in the same manner as before (S140).

When the second determiner 330 determines the presence of the plurality of corner patterns corresponding to the target kernel (e.g., the number of corner patterns in S110=plural number), the third determiner 340 may apply the Laplacian filter to the target kernel in which the target pixel DP determined to be a defective pixel by the defective pixel detector 200 is located at the center of the target kernel (S120). The third determiner 340 may determine whether the number of corner patterns corresponding to the target kernel is 1.

When the third determiner 340 determines the presence of only one corner pattern corresponding to the target kernel (e.g., the number of corner patterns in S120=singular number), the pixel interpolator 350 may interpolate the target pixel DP in the same manner as before (S140).

When the third determiner 340 determines the presence of the plurality of corner patterns corresponding to the target kernel (e.g., the number of corner patterns in S120=plural number), it can be seen that there is no corner pattern corresponding to the target kernel, such that the pixel interpolator 350 may interpolate the target pixel DP based on the pixel data of pixels having the same colors as the target pixel DP belonging to the target kernel (S130). For example, when the target pixel DP is a blue pixel, the pixel interpolator 350 may determine an average value of pixel data of all blue pixels belonging to the target kernel to be pixel data of the target pixel DP.

Referring to FIG. 5, the first determiner 320 may calculate a similarity score by comparing the reference gradient combination with the target gradient combination for the target kernel (S200). The similarity score may refer to the number of pixel pairs in which the target gradient and the reference gradient are identical to each other by comparing the target gradient combination with the reference gradient combination based on the each of the pixel pairs. For example, the similarity score may be set by comparing the target gradient of the pixel pairs and the reference gradient of the pixel pairs. The number of the pixel pairs whose the target gradient and the reference gradient match each other may be the similarity score.

The first determiner 320 may determine a corner pattern corresponding to the target kernel based on the similarity score. In addition, when the number of corner patterns corresponding to the target kernel is 1 based on the similarity score (i.e., 'Yes' in S210), the first determiner 320 may transmit pixel data of the corner pattern including the target pixel DP to the pixel interpolator 350. The target pixel DP may be positioned at the texture or non-texture region of the corner pattern.

For example, when the target pixel DP is positioned at the texture region of the corner pattern, the first determiner 320 may transmit pixel data of pixels of the texture region to the pixel interpolator 350.

When the number of corner patterns corresponding to the target kernel is determined to be a plural number based on the similarity score (i.e., 'No' in S210), the first determiner 320 may transmit identification information for identifying the corner patterns to the second determiner 330.

For example, when the corner patterns are PT_A, PT_B, PT_C, and PT_D, the first determiner 320 may transmit the identification information of the corner patterns PT_A, PT_B, PT_C, and PT_D to the second determiner 330. The second determiner 330 may select at least one of the corner patterns PT_A, PT_B, PT_C, PT_D as candidate corner patterns.

FIG. 6A is a schematic diagram illustrating an example of a plurality of pixel pairs (1) to (22) to be used in a reference gradient combination. When the reference gradient combination is calculated for an arbitrary kernel, a difference value between pixel data of pixels of each pixel pair can be calculated based on image data (IDATA) that was input to the kernel by using the positions of pixel pairs used in the reference gradient without change. As a result, 22 results can be listed as shown in FIG. 6A. The input image data (IDATA) may be different for each kernel. Thus, even when the reference gradient combination obtained using the same pixel pairs is used, the result of calculating the reference gradient combination for each kernel may be different. In this case, the target pixel DP may correspond to a blue or red pixel. One embodiment for calculating the reference gradient combination according to the disclosed technology may use an example case in which image data (IDATA) input to the target kernel corresponds to 8 corner patterns shown in FIG. 3.

FIG. 6B is a schematic diagram illustrating an example of a plurality of pixel pairs (1) to (22) to be used in the reference gradient combination. In this case, the target pixel DP may correspond to a green pixel G.

FIG. 7 is a conceptual diagram illustrating an example of a method for calculating a similarity score by applying the first to twenty-second pixel pairs to the reference gradient combination 500 and comparing the reference gradient combination 500 with the target gradient combination 510 based on each of the pixel pairs.

The reference gradient combination 500 for each of the corner patterns may refer to a result of comparing a difference value between pixel data of each of the plurality of pixel pairs and a preset threshold value. The reference gradient combination 500 may be obtained by combining the results of the plurality of pixel pairs. In addition, the pixel pair to be used in the reference gradient may include two pixels that have the same color but are positioned in different positions in the kernel.

The reference gradient combination 500 may mean that a plurality of different pixel pairs located at predetermined positions with respect to a kernel is selected, and a difference value between pixel data of pixels for each of the selected pixel pairs is compared with a threshold value so that one of two results denoted by "Large" and "Small" is listed depending on the pixel pair. In addition, the reference gradient combination 500 may vary depending on the type and number of corner patterns. For example, based on (1) pixel pairs, the result value of the PT_A kernel is large because it is abs(P11−P15)>=threshold value, and the result value of the 400 kernel is abs(P11−P15)<threshold value, so it corresponds to small.

A target gradient combination 510 for the target kernel 400 may mean a result of a reference gradient with the plurality of pixel pairs. The reference gradient may be obtained by comparing a difference value between pixel data of pixels of each of the plurality of pixel pairs with a predetermined threshold value based on image data (IDATA) that was input to the target kernel 400 by using the positions of pixels of the plurality of pixel pairs used in the reference gradient combination 500 without change.

For example, in a situation where the eleventh pixel P11 and the twenty-third pixel P23, the third pixel P3 and the fifteenth pixel P15 are set to a pixel pair to be used in the reference gradient combination 500, the results such as "Large" and "Small" can be calculated based on the result of combination. Here, the reference gradient may be obtained by comparing the threshold value with each of a first difference between pixel data of the positions of the eleventh pixel P11 and pixel data of the twenty-third pixel P23, and a second difference between pixel data of the positions of the third pixel P3 and pixel data of the fifteenth pixel P15.

For example, when 22 pairs of pixels of FIG. 6A are used in the reference gradient combination 500 to determine the corner pattern corresponding to the target kernel 400 from among the eight corner patterns PT_A to PT_H shown in FIG. 3, for each of the corner patterns PT_A to PT_H, a difference between pixel data of pixels for each pixel pair may be compared with the threshold value, and one of two results denoted by "Large" and "Small" may be listed according to 22 pixel pairs, so that the resultant list of two expressions "Large" and "Small" can be defined as the reference gradient combination 500.

In addition, the target gradient combination 510 for the target kernel 400 may refer to a result expressed as one of two results of 'large' and 'small' by comparing the difference value between pixel data of each of the plurality of pixel pairs and the threshold value based on the image data (IDATA) input into the target kernel 400 using the pixel position of the plurality of pixel pairs used in the reference gradient combination 500. Results of 'large' and 'small' may be listed according to 22 pairs of pixels.

In FIG. 7, the same gradient between the corner pattern PT_A and the target kernel 400 may be obtained in a total of 11 pixel pairs (i.e., the pixel pairs (3), (6), (7), (9), (12), (14), (16), (18), (20), (21), and (22)), so that the similarity score can be defined as a score of 11. In this way, the similarity score between the target kernel 400 and each of the corner patterns PT_B to PT_H can be calculated, and the corner patterns each having the highest similarity score of 12 are a plurality of corner patterns PT_F and PT_H, so that the first determiner 320 may not determine a pattern corresponding to the target kernel 400 and may transmit identification information of each of the corner patterns PT_F and PT_H to the second determiner 330.

Figure 8:
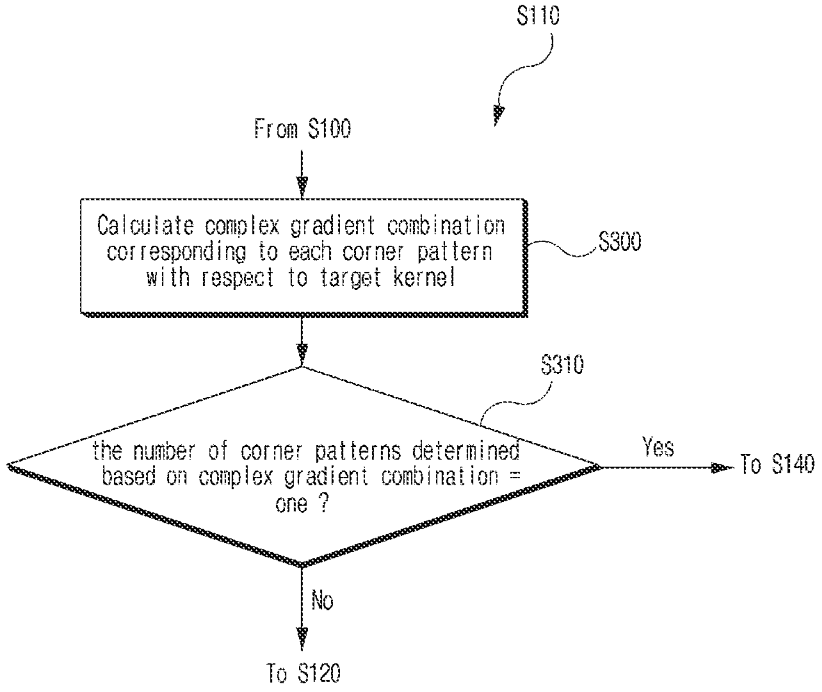
FIG. 8 is a flowchart illustrating an example of detailed operations of the operation S110 shown in FIG. 4 based on some implementations of the disclosed technology.
Figure 9A:
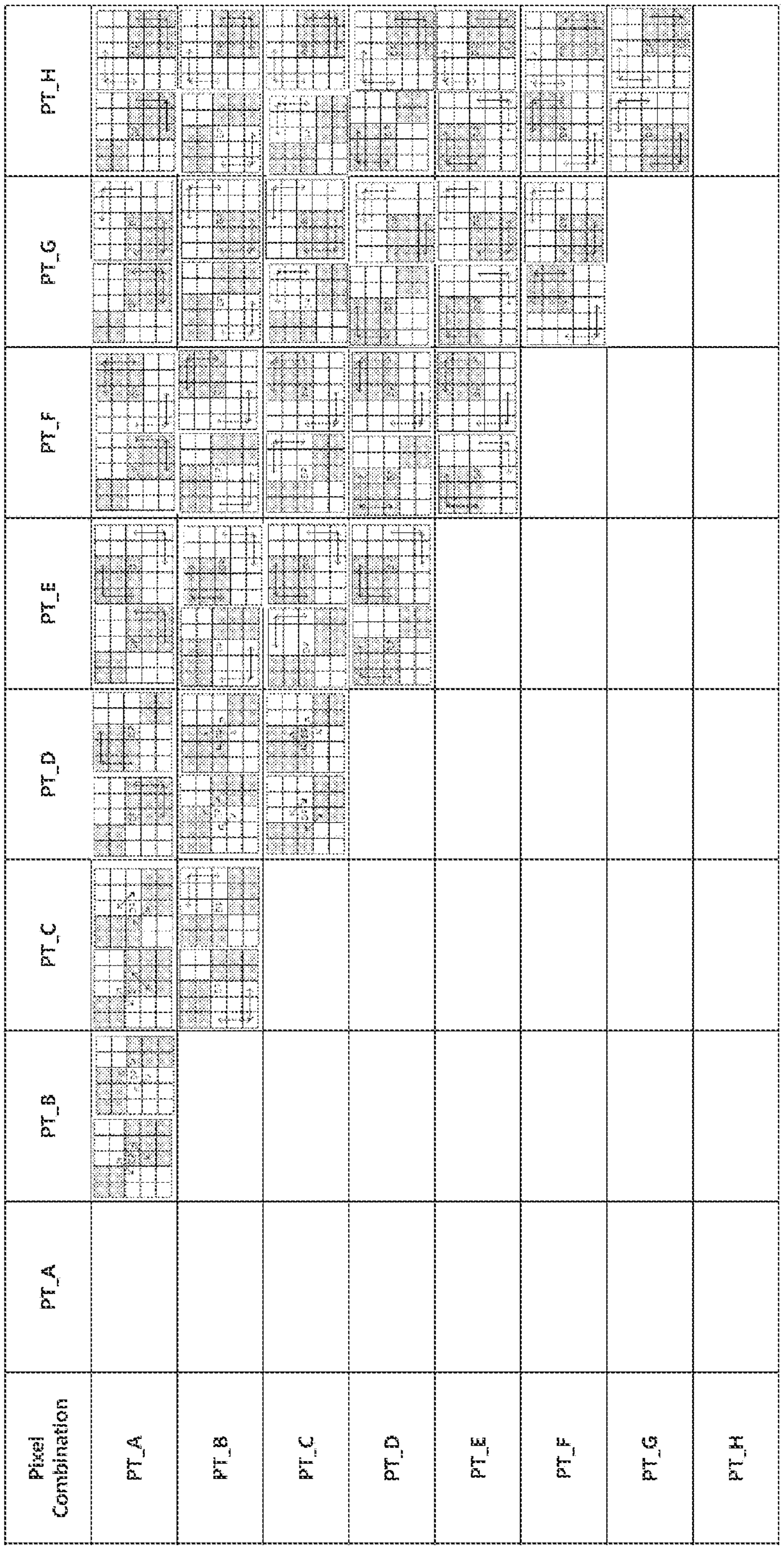
FIGS. 9A and 9B are schematic diagrams illustrating examples of pixel combinations used in complex gradient combinations of the operation S300 shown in FIG. 8 based on some implementations of the disclosed technology.
Figure 9B:
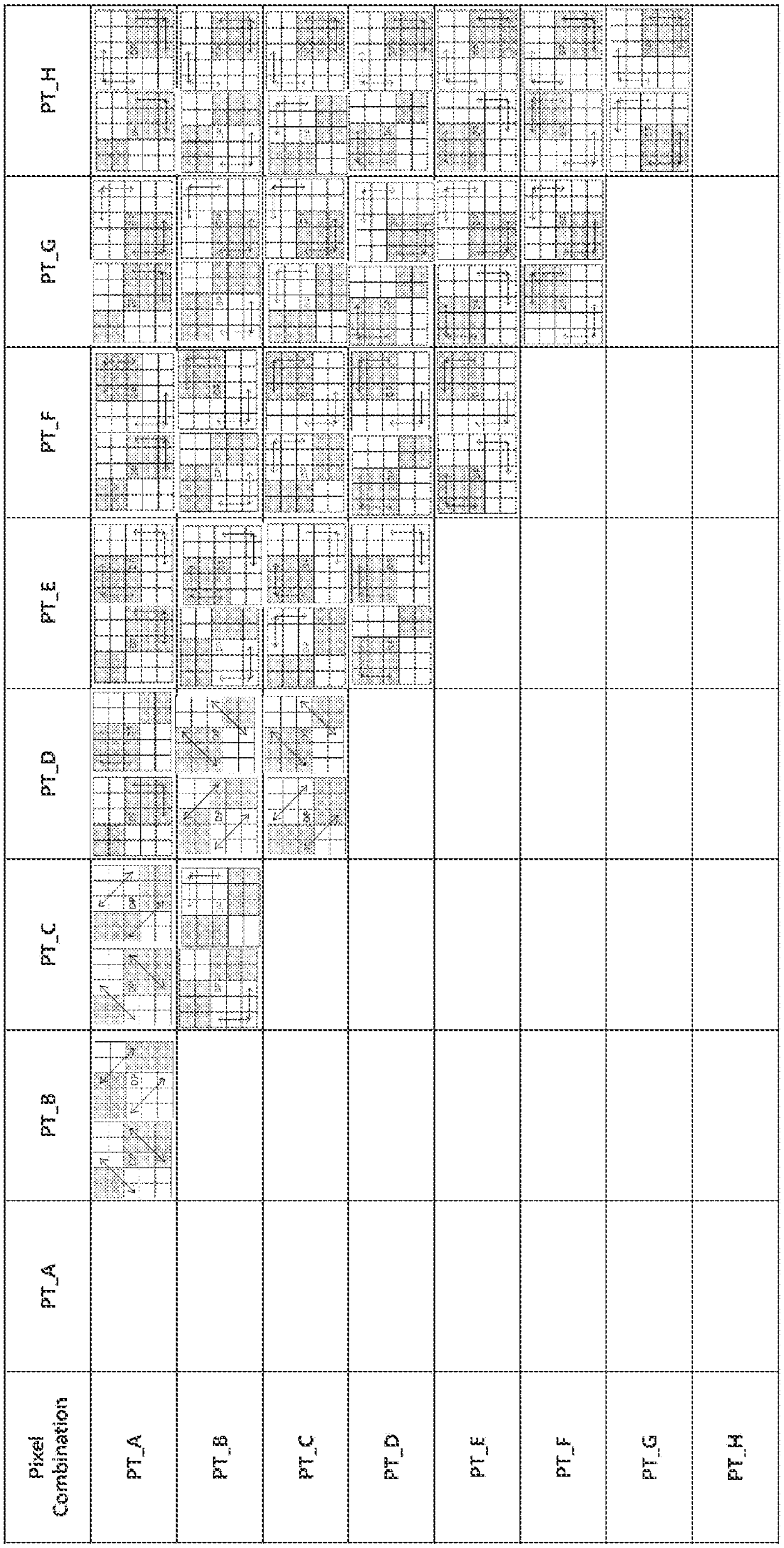

FIG. 8 is a flowchart illustrating an example of detailed operations of the operation S110 shown in FIG. 4 based on some implementations of the disclosed technology. FIGS. 9A and 9B are schematic diagrams illustrating examples of pixel combinations used in complex gradient combinations of the operation S300 shown in FIG. 8 based on some implementations of the disclosed technology.

Referring to FIG. 8, the second determiner 330 may calculate a complex gradient combination corresponding to the corner patterns provided from the first determiner 320 with respect to the target kernel (S300). The complex gradient combination may refer to a result of comparison between average values of difference values between pixel data of the two pixels including the same color for each of the pixel combinations. Each of the pixel combinations may include at least one or more pixel groups paired with each other. For example, the complex gradient combination is based on the similarity score provided from the first determiner 320.

The second determiner 330 may determine a corner pattern corresponding to the target kernel based on a result of calculating the complex gradient combination with respect to the target kernel. In addition, when the number of corner patterns corresponding to the target kernel is determined to be only one (1) based on the complex gradient combination ('Yes' in S310), the second determiner 330 may transmit pixel data of pixels belonging to the same region as the texture or non-texture region of the corner pattern including the target pixel DP to the pixel interpolator 350.

For example, when the target pixel DP is included in the texture region of a determined corner pattern, the second determiner 330 may transmit pixel data of pixels included in the texture region of the determined corner pattern to the pixel interpolator 350.

When the number of corner patterns corresponding to the target kernel is determined to be a plural number based on the complex gradient combination ('No' in S310), the second determiner 330 may transmit identification information of each of the determined corner patterns to the third determiner 340.

For example, when the corner patterns are PT_B and PT_C, the second determiner 330 may transmit identification information of the corner patterns PT_B and PT_C to the third determiner 340, and the third determiner 340 may determine the corner pattern using the corner patterns PT_B and PT_C as candidate corner patterns.

FIG. 9A is a schematic diagram illustrating an example of pixel combinations used in a complex gradient combination. When a complex gradient combination for an arbitrary kernel is calculated, an average of difference values between pixel data of pixels of each of the pixel combinations can be calculated based on image data (IDATA) that was input to the kernel by using the positions of pixels of the pixel combinations used in the complex gradient combination without change.

Two pixel combinations may be included in each cell of the table of FIG. 9A. In FIG. 9A, a left pixel combination may correspond to a corner pattern corresponding to a row of the cell of the table, and a right pixel combination may correspond to a corner pattern corresponding to a column of the cell of the table. The two pixel combinations may correspond to the pixels indicated by the arrows. For example, referring to PT_A and PT_B of FIG. 9A, two pixel combinations of PT_A may correspond to (P8, P12) and (P14, P18), and two pixel combinations of PT_B may correspond to (P8, P14) and (P12, P18). Pixel combinations included in a cell that is located at the row of the pattern PT_A and the column of the pattern PT_B may correspond to pixel combinations that are used in the complex gradient combination for comparing the pattern PT_A and PT_B.

The input image data (IDATA) may be different for each kernel. Thus, even when the complex gradient combination obtained using the same pixel combinations is used, the result of calculating the complex gradient combination for each kernel may be different. In this case, the target pixel DP may correspond to a blue or red pixel.

FIG. 9B is a schematic diagram illustrating an example of pixel combinations used when corner patterns are compared with each other. At this time, the target pixel DP may correspond to a green pixel.

The complex gradient combination may refer to a result of comparison between average values of different values between pixel data of two pixels for each of the pixel combinations corresponding to the corner pattern. In addition, the complex gradient combination may mean that an average of difference values between pixel data of the pixel pair for each of the pixel combinations corresponding to the corner pattern is compared with a predetermined threshold value so as to indicate one of two results denoted by "Large" and "Small".

Pixel combinations used in the complex gradient may refer to pixel pairs in which pixels of the same color are paired with each other, and pixel combinations to be used in the complex gradient combination corresponding to each corner pattern may be determined in advance for each corner pattern.

For example, referring to FIG. 3 together, a pair of the eleventh pixel P11 and the twenty-third pixel P23 and a pair of the third pixel P3 and the fifteenth pixel P15 may be determined to be a pixel combination corresponding to the first corner pattern. A pair of the twelfth pixel P12 and the eighteenth pixel P18, and a pair of the eighth pixel P8 and the fourteenth pixel P14 may be determined to be a pixel combination corresponding to the second corner pattern.

At this time, in a situation where the first corner pattern and the second corner pattern are candidate corner patterns, when a complex gradient combination corresponding to the first corner pattern and the second corner pattern is calculated for an arbitrary kernel, only one result from among the results denoted by "$avg\{abs(P11-P23)+abs(P3-P15)\}<avg\{abs(P12-P18)+abs(P8-P14)\}$", "avg{abs(P11−

P23)+abs(P3–P15)}=avg{abs(P12–P18)+abs(P8–P14)}” and “avg{abs(P11–P23)+abs(P3–P15)}>avg{abs(P12–P18)+abs(P8–P14)}” can be obtained. Here, “avg” is an operator for finding average values and “abs” is an operator for finding absolute values.

In addition, the second determiner 330 may calculate a complex gradient combination, and may determine the corner pattern corresponding to pixel combinations having the same or smaller average value to be the corner pattern corresponding to the target kernel. Therefore, in a situation where the first corner pattern and the second corner pattern are used as candidate patterns, when the result of calculating a complex gradient combination corresponding to the first corner pattern and the second corner pattern with respect to the target kernel is denoted by “avg{abs(P11–P23)+abs(P3–P15)}<avg{abs(P12–P18)+abs(P8–P14)}”, the first corner pattern may be determined to be a corner pattern corresponding to the target kernel, and when the result of calculating a complex gradient combination corresponding to the first corner pattern and the second corner pattern with respect to the target kernel is denoted by “avg{abs(P11–P23)+abs(P3–P15)}=avg{abs(P12–P18)+abs(P8–P14)}”, the first corner pattern and the second corner pattern may be determined to be corner patterns corresponding to the target kernel.

Referring back to FIG. 9A, for example, when the corner patterns determined by the first determiner 320 are PT_B and PT_C of FIG. 3, a pair of the eleventh pixel P11 and the twenty-first pixel P21 and a pair of the twenty-first pixel P21 and the twenty-third pixel P23 may be determined to be a pixel combination corresponding to PT_B, and a pair of the third pixel P3 and the fifth pixel P5 and a pair of the fifth pixel P5 and the fifteenth pixel P15 may be determined to be a pixel combination corresponding to PT_C.

When the complex gradient combination corresponding to PT_B and PT_C is calculated, only one result from among the results denoted by “avg{abs(P11–P21)+abs(P21–P23)}<avg{abs(P3–P5)+abs(P5–P15)}”, “avg{abs(P11–P21)+abs(P21–P23)}=avg{abs(P3–P5)+abs(P5–P15)}” and “avg{abs(P11–P21)+abs(P21–P23)}>avg{abs(P3–P5)+abs(P5–P15)}” can be obtained.

At this time, the second determiner 330 may calculate the complex gradient combination, and may determine the corner pattern corresponding to pixel combinations having the same or smaller average value to be the corner pattern corresponding to the target kernel. Therefore, in a situation where the corner pattern PT_B and the corner pattern PT_C are used as candidate patterns, when the result of calculating a complex gradient combination corresponding to PT_B and PT_C with respect to the target kernel is denoted by “avg{abs(P11–P21)+abs(P21–P23)}<avg{abs(P3–P5)+abs(P5–P15)}”, the corner pattern PT_B may be determined to be a corner pattern corresponding to the target kernel, and when the result of calculating a complex gradient combination corresponding to PT_B and PT_C with respect to the target kernel is denoted by “avg{abs(P11–P21)+abs(P21–P23)}=avg{abs(P3–P5)+abs(P5–P15)}”, the corner patterns PT_B and PT_C may be determined to be corner patterns corresponding to the target kernel.

Referring back to FIG. 9A, for example, when the corner patterns determined by the first determiner 320 are denoted by PT_A, PT_C, and PT_H of FIG. 3, the complex gradient combinations corresponding to (PT_A and PT_C), (PT_A and PT_H), and (PT_C and PT_H) can be calculated.

When the complex gradient combination corresponding to PT_A and PT_C is calculated, only one result from among the plurality of results denoted by “avg{abs(P8–P12)+abs(P14–P18)}<avg{abs(P12–P18)+abs(P8–P14)}”, “avg{abs(P8–P12)+abs(P14–P18)}=avg{abs(P12–P18)+abs(P8–P14)}”, and “avg{abs(P8–P12)+abs(P14–P18)}>avg{abs(P12–P18)+abs(P8–P14)}” can be obtained.

When the complex gradient combination corresponding to PT_A and PT_H is calculated, only one result from among the plurality of results denoted by “avg{abs(P23–P25)+abs(P25–P15)}<avg{abs(P1–P11)+abs(P1–P3)+abs(P23–P25)+abs(P25–P15)}”, “avg{abs(P23–P25)+abs(P25–P15)}=avg{abs(P1–P11)+abs(P1–P3)+abs(P23–P25)+abs(P25–P15)}”, and “avg{abs(P23–P25)+abs(P25–P15)}>avg{abs(P1–P11)+abs(P1–P3)+abs(P23–P25)+abs(P25–P15)}” can be obtained.

When the complex gradient combination corresponding to PT_C and PT_H is calculated, only one result from among the plurality of results denoted by “avg{abs(P3–P5)+abs(P5–P8)}<avg{abs(P1–P11)+abs(P1–P3)+abs(P23–P25)+abs(P25–P15)}”, “avg{abs(P3–P5)+abs(P5–P8)}=avg{abs(P1–P11)+abs(P1–P3)+abs(P23–P25)+abs(P25–P15)}”, and “avg{abs(P3–P5)+abs(P5–P8)}>avg{abs(P1–P11)+abs(P1–P3)+abs(P23–P25)+abs(P25–P15)}” can be obtained.

At this time, the second determiner 330 may calculate the complex gradient combination, and may determine the corner pattern corresponding to pixel combinations having the same or smaller average value to be the corner pattern corresponding to the target kernel. Therefore, in a situation where the corner patterns (PT_A, PT_C, PT_H) are used as candidate patterns, i) when the result of calculating a complex gradient combination corresponding to PT_A and PT_C with respect to the target kernel is denoted by “avg{abs(P8–P12)+abs(P14–P18)}<avg{abs(P12–P18)+abs(P8–P14)}”, ii) when the result of calculating a complex gradient combination corresponding to PT_A and PT_H with respect to the target kernel is denoted by “avg{abs(P23–P25)+abs(P25–P15)}=avg{abs(P1–P11)+abs(P1–P3)+abs(P23–P25)+abs(P25–P15)}”, and iii) when the result of calculating a complex gradient combination corresponding to PT_C and PT_H with respect to the target kernel is denoted by “avg{abs(P3–P5)+abs(P5–P8)}>avg{abs(P1–P11)+abs(P1–P3)+abs(P23–P25)+abs(P25–P15)}”, the corner patterns PT_A and PT_H may be determined to be corner patterns corresponding to the target kernel.

At this time, the second determiner 330 may calculate the complex gradient combination, and may determine the corner patterns (PT_A, PT_H) corresponding to pixel combinations each having “Small” to be corner patterns corresponding to the target kernel, and may transmit identification information of the corner patterns (PT_A, PT_H) to the third determiner 340.

Figure 10:
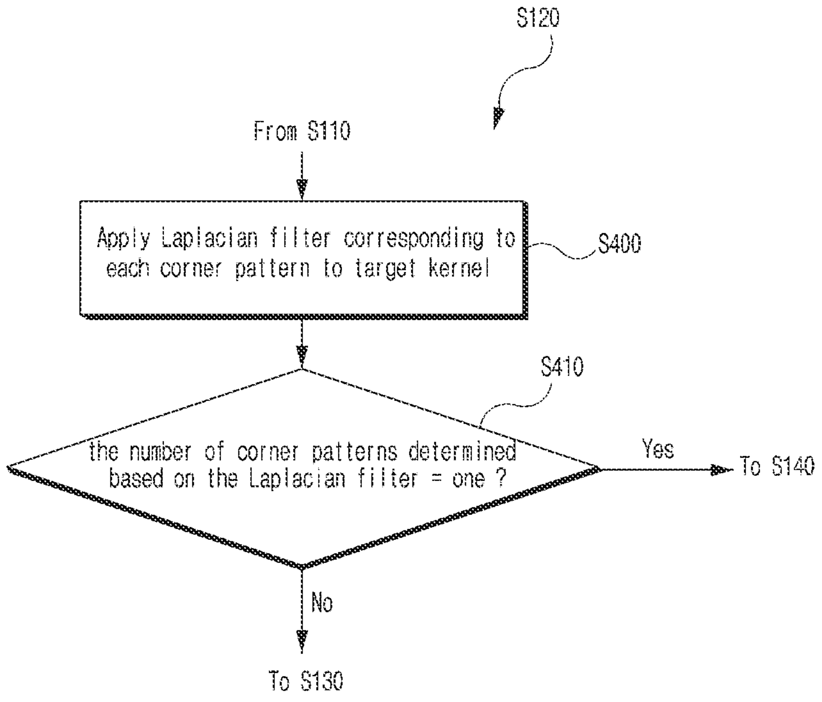
FIG. 10 is a flowchart illustrating an example of detailed operations of the operation S120 shown in FIG. 4 based on some implementations of the disclosed technology.

FIG. 10 is a flowchart illustrating an example of detailed operations of the operation S120 shown in FIG. 4 based on some implementations of the disclosed technology. FIGS. 11A and 11B are schematic diagrams illustrating examples of pixel combinations used in the Laplacian filter of the operation S400 of FIG. 10 based on some implementations of the disclosed technology.

Referring to FIG. 10, the third determiner 340 may apply the Laplacian filter corresponding to each of the corner patterns provided from the second determiner 330 to the target kernel (S400). The Laplacian filter may mean a difference between a value obtained by doubling pixel data of one of three pixels for each pixel combination and a value corresponding to the sum of pixel data values of the remaining two pixels other than the one pixel. For example, the Laplacian filter may be applied based on the complex gradient combination.

The third determiner 340 may determine a corner pattern corresponding to the target kernel based on the result of applying the Laplacian filter to the target kernel. In addition, when the number of corner patterns corresponding to the target kernel is determined to be only one based on the Laplacian filter ('Yes' in S410), the third determiner 340 may transmit pixel data of pixels belonging to the same region as the texture or non-texture region of the corner pattern including the target pixel DP (S420).

For example, when the target pixel DP is included in the texture region of one determined corner pattern, pixel data of pixels included in the texture region of the determined corner pattern may be transmitted to the pixel interpolator 350 (S420).

When the number of corner patterns corresponding to the target kernel is determined to be a plural number based on the Laplacian filter ('No' in S410), the third determiner 340 may transmit, to the pixel interpolator 350, information indicating that the corner pattern cannot be specified.

For example, when the determined corner patterns are PT_B and PT_C, the third determiner 340 may transmit, to the pixel interpolator 350, information indicating that the corner pattern cannot be specified.

FIG. 11A illustrates an example of eight pixel combinations corresponding to each corner pattern used in the Laplacian filter. When the Laplacian filter is applied to an arbitrary kernel, a difference between a value obtained by doubling the pixel data of one pixel of three pixels for each pixel combination and a value corresponding to the sum of pixel data values of the remaining two pixels may be calculated based on image data (IDATA) that was input to the kernel by using the positions of pixels of the pixel combinations used in the Laplacian filter without change.

Each cell of the table shown in FIG. 11A may include a pixel combination corresponding to the corner pattern. One pixel where a circular dot located at the center of each arrow is located, and pixels pointed to by both ends of the arrow may be a pixel combination used in the Laplacian filter.

The input image data (IDATA) may be different for each kernel. Thus, even when the Laplacian filter obtained using the same pixel combination is used, the result of applying the Laplacian filter to each kernel may be different. In this case, the target pixel DP may correspond to a blue or red pixel.

FIG. 11B illustrates an example of 8 pixel combinations corresponding to each corner pattern used in the Laplacian filter. At this time, the target pixel DP may correspond to a green pixel.

The Laplacian filter may refer to the result of indicating a difference between a value obtained by doubling pixel data of one of three pixels for each pixel combination corresponding to the corner pattern and a value corresponding to the sum of pixel data values of the remaining two pixels other than the one pixel.

In addition, the Laplacian filter may refer to one of two results "Large" and "Small" obtained by comparing a predetermined threshold value with a difference between a value obtained by doubling pixel data of one of three pixels for each pixel combination corresponding to the corner pattern and a value corresponding to the sum of pixel data values of the remaining two pixels other than one pixel.

The pixel combination used in the Laplacian filter may mean that pixels of the same color are grouped together, and the pixel combination used in the Laplacian filter corresponding to each pattern may be determined in advance for each pattern.

For example, a combination of the eleventh pixel P11, the third pixel P3, and the fifteenth pixel P15, and a combination of the third pixel P3, the fifteenth pixel P15, and the twenty-third pixel P23 may be determined to be pixel combinations corresponding to a first corner pattern, and a combination of the eleventh pixel P11, the twenty-third pixel P23, and the fifteenth pixel P15, and a combination of the twenty-third pixel P23, the fifteenth pixel P15, and the third pixel P3 may be determined to be pixel combinations corresponding to a second corner pattern.

At this time, in a situation where the first corner pattern and the second corner pattern are candidate patterns, when the Laplacian filter corresponding to the first corner pattern is calculated for an arbitrary kernel, the result of comparing each of "abs(P3*2−P11−P15)" and "abs(P15*2−P15−P23)" with a predetermined threshold value can be obtained based on the calculated Laplacian filter. Further, when the Laplacian filter corresponding to the second corner pattern is calculated, the result of comparing each of "abs(P23*2−P11−P15)" and "abs(P15*2−P23−P15)" with a predetermined threshold value based on the calculated Laplacian filter can be obtained.

In addition, the third determiner 340 may calculate the Laplacian filter, and may determine a corner pattern corresponding to the target kernel based on the results listed according to pixel combinations. Therefore, in a situation where the first corner pattern and the second corner pattern are candidate patterns, i) when the result corresponding to the first corner pattern is denoted by "(Small, Small)" and the result corresponding to the second corner pattern is denoted by "(Small, Large)", and ii) when the result of calculating the complex gradient combination corresponding to the first corner pattern with respect to the target kernel is denoted by "(Small, Small)" and the result of calculating the complex gradient combination corresponding to the second corner pattern with respect to the target kernel is denoted by "(Small, Small)", the first corner pattern may be determined to be a corner pattern corresponding to the target kernel.

Referring back to FIG. 11A, for example, in a situation where the corner patterns determined by the second determiner 330 are denoted by PT_D and PT_H of FIG. 3, a combination of the twelfth pixel P12, the eighth pixel P8, and the fourth pixel P4 and a combination of the sixteenth pixel P16, the twelfth pixel P12, and the eighth pixel P8 may be determined to be pixel combinations corresponding to the corner pattern PT_D, and a combination of the eighteenth pixel P18, the fourteenth pixel P14, and the tenth pixel P10 and a combination of the $22^{nd}$ pixel P22, the eighteenth pixel P18, and the fourteenth pixel P14 may be determined to be pixel combinations corresponding to PT_H.

When the Laplacian filter corresponding to PT_D is used, the result of comparing each of "abs(P8*2−P12−P4)" and "abs(P12*2−P16−P8)" with a predetermined threshold value can be obtained, and when the Laplacian filter corresponding to PT_H is used, the result of comparing each of "abs(P14*2−P18−P10)" and "abs(P18*2−P22−P14)" with a predetermined threshold value can be obtained.

At this time, when all the results obtained by comparing the resultant values of the respective pixel combinations with a threshold value using the Laplacian filter are denoted by "Small", the third determiner 340 may determine corner patterns of the corresponding pixel combination to be corner patterns corresponding to the target kernel. Therefore, in a situation where the corner patterns PT_D and PT_H are candidate patterns, i) when the result obtained by applying the Laplacian filter corresponding to PT_D to the target kernel is denoted by "(Small, Small)", and ii) when the result obtained by applying the Laplacian filter corresponding to PT_H to the target kernel is denoted by "(Small, Large)", the corner pattern PT_D may be determined to be a corner pattern corresponding to the target kernel.

Referring back to FIG. 11B, for example, in a situation where the corner patterns determined by the second determiner 330 are denoted by PT_D and PT_H of FIG. 3, a combination of the eleventh pixel P11, the seventh pixel P7, and the third pixel P3 and a combination of the seventeenth pixel P17, the seventh pixel P7, and the ninth pixel P9 may be determined to be pixel combinations corresponding to the corner pattern PT_D, and a combination of the seventeenth pixel P17, the nineteenth pixel P19, and the ninth pixel P9 and a combination of the twenty-third pixel P23, the nineteenth pixel P19, and the fifteenth pixel P15 may be determined to be pixel combinations corresponding to PT_H.

When the Laplacian filter corresponding to PT_D is used, the result of comparing each of "abs(P7*2−P11−P3)" and "abs(P7*2−P17−P9)" with a predetermined threshold value can be obtained, and when the Laplacian filter corresponding to PT_H is used, the result of comparing each of "abs(P19*2−P17−P9) and "abs(P19*2−P23−P15)" with the predetermined threshold value can be obtained.

At this time, in a situation where the resultant value of each pixel combination is compared with a threshold value using the Laplacian filter, when the result of a pixel combination corresponding to each solid arrow is denoted by "Small" and the result of a pixel combination corresponding to each dotted arrow is denoted by "Large", the corner pattern of the corresponding pixel combination may be determined to be a corner pattern corresponding to the target kernel. Therefore, in a situation where PT_D and PT_H are candidate patterns, the result of applying the Laplacian filter corresponding to PT_D to the target kernel is denoted by "(Small, Large)" according to the order of pixel combinations shown in FIG. 11B, and the result of applying the Laplacian filter corresponding to PT_H to the target kernel is denoted by "(Small, Small)" according to the order of pixel combinations shown in FIG. 11B, the corner pattern PT_D may be determined to be a corner pattern corresponding to the target kernel.

At this time, the third determiner 340 may determine the corner pattern PT_D to be a corner pattern corresponding to the target kernel according to the result of applying the Laplacian filter to the target kernel, and may transmit information about the corner pattern PT_D to the pixel interpolator 350.

Figure 12:
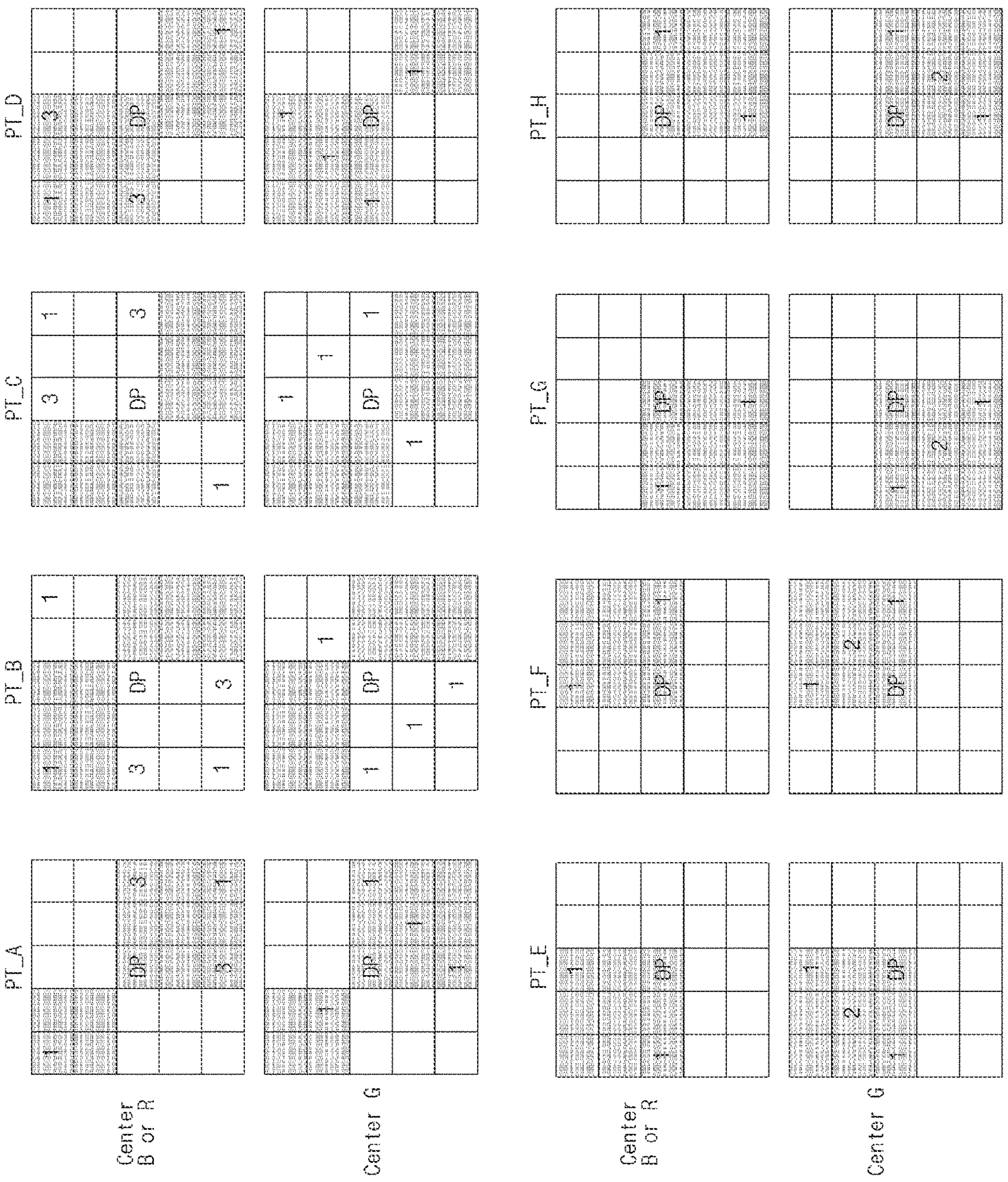
FIG. 12 is a schematic diagram illustrating an example of detailed operations of the operation S140 shown in FIG. 4 based on some implementations of the disclosed technology.
Figure 13:
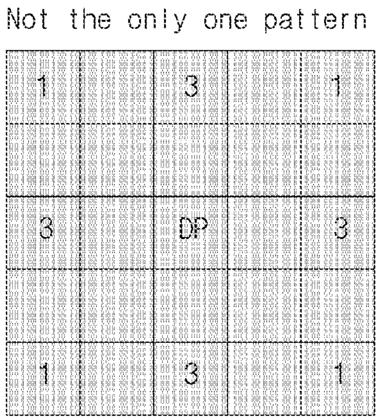
FIG. 13 is a schematic diagram illustrating an example of detailed operations of the operation S130 shown in FIG. 4 based on some implementations of the disclosed technology.

FIG. 12 is a schematic diagram illustrating an example of detailed operations of the operation S140 shown in FIG. 4 based on some implementations of the disclosed technology. FIG. 13 is a schematic diagram illustrating an example of detailed operations of the operation S130 shown in FIG. 4 based on some implementations of the disclosed technology.

Referring to FIG. 12, the pixel interpolator 350 may interpolate the target pixel DP based on a value obtained by applying a weight to pixel data of some pixels that belong to the same region as the corner pattern region including the target pixel DP and correspond to the same color as the target pixel DP. This is because, when one corner pattern is determined, the target kernel is similar to a corner pattern rather than a flat pattern, so that a method for interpolating the corner pattern can be considered more appropriate.

For example, when no weight is used and the corner pattern corresponding to the target kernel is determined to be PT_A, the pixel interpolator 350 may calculate an average value of pixel data of some pixels (i.e., the first pixel P1, the fifteenth pixel P15, the twenty-third pixel P23, and the twenty-fifth pixel P25) that belong to the same region as the corner pattern region including the target pixel DP while having the same color as the target pixel DP, and may determine the calculated average value to be pixel data of the target pixel DP.

In addition, when weights are used, the pixel interpolator 350 may calculate a weighted average value of a first value obtained when '3' is multiplied by pixel data of the fifteenth pixel P15 and the twenty-third pixel P23 from among the pixels (P1, P15, P23, P25) and a second value obtained when '1' is multiplied by pixel data of the first pixel P1 and the $25^{th}$ pixel P25 from among the pixels (P1, P15, P23, P25), and may determine the calculated average value to be pixel data of the target pixel DP. Here, the pixels P15 and P23 used to calculate the first value may be located closer to the target pixel DP, and the other pixels P1 and P25 used to calculate the second value may be located farther from the target pixel DP.

Referring to FIG. 13, the target pixel DP may be interpolated based on a value obtained by applying the weight to pixel data of pixels having the same color as the target pixel DP. This is because, when multiple corner patterns are determined, the target kernel is located similar to the flat pattern rather than the corner pattern, so that a method of interpolating the flat pattern may be considered more appropriate.

For example, when no weight is used and the corner patterns corresponding to the target kernel are determined to be PT_A and PT_B, the pixel interpolator 350 may determine an average value of the pixel data of some pixels (i.e., P1, P3, P5, P11, P15, P21, P23, P25) having the same color as the target pixel DP to be pixel data of the target pixel DP.

In addition, when weights are used, the pixel interpolator 350 may calculate a weighted average value of a first value obtained when '3' is multiplied by pixel data of some pixels (P3, P11, P15, P23) located closer to the target pixel DP from among the pixels (P1, P3, P5, P11, P15, P21, P23, P25) and a second value obtained by when '1' is multiplied by pixel data of some pixels (P1, P5, P21, P25) located farther from the target pixel DP from among the pixels (P1, P3, P5, P11, P15, P21, P23, P25), and may determine the calculated average value to be pixel data of the target pixel DP.

Figure 14:
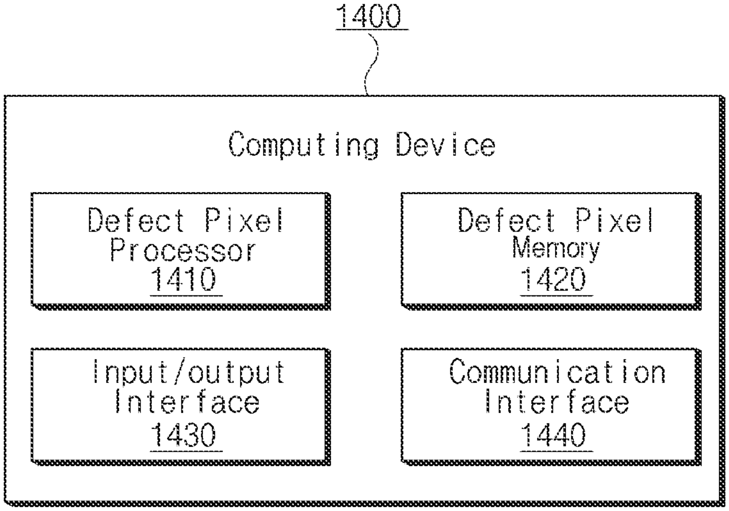
FIG. 14 is a block diagram illustrating an example of a computing device corresponding to the image signal processor of FIG. 1 based on some implementations of the disclosed technology.

FIG. 14 is a block diagram showing an example of a computing device 1000 corresponding to the image signal processor of FIG. 1.

Referring to FIG. 14, the computing device 1400 may represent an embodiment of a hardware configuration for performing the operation of the image signal processor 100 of FIG. 1.

The computing device 1400 may be mounted on a chip that is independent from the chip on which the image sensing device is mounted. According to one embodiment, the chip on which the image sensing device is mounted and the chip on which the computing device 1400 is mounted may be implemented in one package, for example, a multi-chip package (MCP), but the scope of the disclosed technology is limited thereto.

Additionally, the internal configuration or arrangement of the image sensing device and the image signal processor 100 described in FIG. 1 may vary depending on the embodiment. For example, at least a portion of the image sensing device may be included in the image signal processor 100. Alternatively, at least a portion of the computing device 1400 may be included in the image sensing device. In this case, at least a portion of the computing device 1400 may be mounted together on a chip on which the image sensing device is mounted.

The computing device 1400 may include a Defect Pixel Processor 1410, a Defect Pixel Memory 1420, an input/output interface 1430, and a communication interface 1440.

The Defect Pixel Processor 1410 may process data and/or instructions required to perform the operations of the components (100, 200) of the image signal processor 100 described in FIG. 1. That is, the Defect Pixel Processor 1410 may refer to the image signal processor 100, but the scope of the disclosed technology is not limited thereto.

The Defect Pixel Memory 1420 may store data and/or instructions required to perform operations of the components (100, 200) of the image signal processor 100, and may be accessed by the Defect Pixel Processor 1410. For example, the Defect Pixel Memory 1420 may be volatile memory (e.g., Dynamic Random Access Memory (DRAM), Static Random Access Memory (SRAM), etc.) or non-volatile memory (e.g., Programmable Read Only Memory (PROM), Erasable PROM (EPROM), etc.), EEPROM (Electrically Erasable PROM), flash memory, etc.).

That is, the computer program for performing the operations of the image signal processor 100 disclosed in this document is recorded in the Defect Pixel Memory 1420 and executed and processed by the Defect Pixel Processor 1410, thereby implementing the operations of the image signal processor 100.

The input/output interface 1430 is an interface that connects an external input device (e.g., keyboard, mouse, touch panel, etc.) and/or an external output device (e.g., display) to the Defect Pixel Processor 1410 to allow data to be transmitted and received.

The communication interface 1440 is a component that can transmit and receive various data with an external device (e.g., an application processor, external memory, etc.), and may be a device that supports wired or wireless communication.

As is apparent from the above description, the image signal processor and the image signal processing method based on some implementations of the disclosed technology can interpolate the target pixel by determining a corner pattern corresponding to a target kernel, and can increase the accuracy of correction for defective pixels even when the target kernel corresponds to the corner pattern.

The embodiments of the disclosed technology may provide a variety of effects capable of being directly or indirectly recognized through the above-mentioned patent document.

Although a number of illustrative embodiments have been described, it should be understood that modifications and enhancements to the disclosed embodiments and other embodiments can be devised based on what is described and/or illustrated in this patent document.

What is claimed is:

1. An image signal processor comprising:

a first determiner configured to compare a target gradient combination for a target kernel including a target pixel with a reference gradient combination for each of a plurality of corner patterns to calculate a similarity score, and determine at least one corner pattern based on the calculated similarity score; and a pixel interpolator configured to interpolate the target pixel using pixel data of interpolation pixels determined based on the corner pattern.

2. The image signal processor according to claim 1, wherein:

the reference gradient combination includes a reference gradient obtained by comparing a threshold value with a difference value between pixel data of each of a plurality of pixel pairs.

3. The image signal processor according to claim 2, wherein the reference gradient combination is configured for the plurality of pixel pairs to be used in the reference gradient combination and changes depending on colors of defective pixel.

4. The image signal processor according to claim 2, wherein:

the pixel pair is two pixels that have the same color but are positioned in different positions.

5. The image signal processor according to claim 1, wherein:

the similarity score represents the number of pixel pairs in which a target gradient is identical to a reference gradient when the target gradient combination is compared with the reference gradient combination based on each of the pixel pairs.

6. The image signal processor according to claim 1, wherein the first determiner is configured to:

determine a corner pattern having the highest similarity score to be the corner pattern corresponding to the target kernel.

7. The image signal processor according to claim 1, further comprising:

a second determiner configured to determine at least one corner pattern of the target kernel based on a complex gradient combination, when a plurality of corner patterns are determined by the first determiner, wherein the complex gradient combination is determined by the plurality of corner patterns determined by the first determiner with respect to the target kernel, and the complex gradient combination represents a result obtained by comparing average values of difference values between pixel data of two pixels for each of a plurality of pixel combinations with each other.

8. The image signal processor according to claim 7, wherein each of the pixel combinations varies depending on colors of defective pixel.

9. The image signal processor according to claim 7, wherein:

the complex gradient combination represents, when average values of difference values between pixel data of two pixels for each of the plurality of pixel combinations are compared with each other, a pixel combination corresponding to a smaller average value.

10. The image signal processor according to claim 7, wherein:

the two pixels are a pair of pixels having the same color.

11. The image signal processor according to claim 7, further comprising:

a third determiner configured to determine, a corner pattern of the target kernel based on a result of applying a Laplacian filter corresponding to the corner patterns determined by the second determiner, when a plurality of corner patterns are determined by the second determiner, wherein the Laplacian filter represents a difference between a value obtained by doubling pixel data of one pixel from among three pixels for each pixel combination and a value corresponding to a sum of pixel data values of remaining two pixels other than the one pixel.

12. The image signal processor according to claim 11, wherein the plurality of pixel combinations to be used in the Laplacian filter varies depending on colors of defective pixels.

13. The image signal processor according to claim 11, wherein:

the three pixels are pixels in which pixels having the same color are grouped.

14. The image signal processor according to claim 11, wherein the pixel interpolator is configured to:

interpolate the target pixel using pixel data of pixels having the same color as the target pixel, when the number of corner patterns determined by the third determiner is a plural number.

15. The image signal processor according to claim 1, wherein:

the corner pattern is a pattern filled with a texture region and a non-texture region, wherein the texture region and the non-texture region are distinguished from each other by using a horizontal line passing through one side of the target pixel and a vertical line passing through the other side of the target pixel as boundary lines.

16. An image signal processing method comprising:

comparing a target gradient combination for a target kernel including a target pixel with a reference gradient combination for each of a plurality of corner patterns to calculate a similarity score;

determining a corner pattern corresponding to the target kernel based on the similarity score; and interpolating the target pixel using pixel data of interpolation pixels determined based on the corner pattern.

17. The image signal processing method according to claim 16, wherein the determining the corner pattern corresponding to the target kernel includes:

when the number of corner patterns determined based on the similarity score is a plural number, determining a corner pattern corresponding to the target kernel based on a result of calculating a complex gradient combination corresponding to each of the corner patterns determined based on the similarity score with respect to the target kernel.

18. The image signal processing method according to claim 17, wherein the determining the corner pattern corresponding to the target kernel includes:

when the number of corner patterns determined based on the complex gradient combination is a plural number, determining a corner pattern corresponding to the target kernel based on a result of applying a Laplacian filter corresponding to each of the corner patterns determined based on the complex gradient combination to the target kernel.

19. The image signal processing method according to claim 16, wherein the interpolating the target pixel includes:

interpolating the target pixel using pixel data of pixels having the same color as the target pixel.

* * * * *